(12) United States Patent
Yan

(10) Patent No.: US 10,501,584 B2
(45) Date of Patent: Dec. 10, 2019

(54) TERMINAL-FUNCTIONALIZED POLYMER AND RELATED METHODS

(71) Applicant: Bridgestone Corporation, Chuo-ku (JP)

(72) Inventor: Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

(21) Appl. No.: 15/540,833

(22) PCT Filed: Dec. 22, 2015

(86) PCT No.: PCT/US2015/067396
§ 371 (c)(1),
(2) Date: Jun. 29, 2017

(87) PCT Pub. No.: WO2016/109345
PCT Pub. Date: Jul. 7, 2016

(65) Prior Publication Data
US 2018/0002490 A1   Jan. 4, 2018

Related U.S. Application Data

(60) Provisional application No. 62/134,034, filed on Mar. 17, 2015, provisional application No. 62/098,031, filed on Dec. 30, 2014.

(51) Int. Cl.
*C08L 83/10* (2006.01)
*C08G 77/442* (2006.01)
*C08F 230/08* (2006.01)

(52) U.S. Cl.
CPC .......... *C08G 77/442* (2013.01); *C08F 230/08* (2013.01); *C08L 83/10* (2013.01)

(58) Field of Classification Search
None
See application file for complete search history.

(56) References Cited

U.S. PATENT DOCUMENTS

| | | |
|---|---|---|
| 5,811,479 A | 9/1998 | Labauze |
| 5,921,149 A | 7/1999 | Masberg et al. |
| 6,369,167 B1 | 4/2002 | Morita et al. |
| 6,852,794 B2 | 2/2005 | Puhala et al. |
| 7,026,387 B2 | 4/2006 | Robert et al. |
| 7,534,839 B2 | 5/2009 | Lawson et al. |
| 7,683,115 B2 | 3/2010 | Hsu et al. |
| 7,799,870 B2 | 9/2010 | Hergenrother et al. |
| 7,906,593 B2 | 3/2011 | Halasa et al. |
| 7,915,349 B2 | 3/2011 | Yamada et al. |
| 7,915,368 B2 | 3/2011 | Hergenrother et al. |
| 2005/0159554 A1 | 7/2005 | Endou et al. |
| 2008/0293858 A1 | 11/2008 | Hergenrother et al. |
| 2012/0136114 A1* | 5/2012 | Nishikawa .......... C08F 297/046 524/575 |
| 2012/0202910 A1 | 8/2012 | Shirai et al. |
| 2013/0165578 A1 | 6/2013 | Francik et al. |
| 2013/0267646 A1 | 10/2013 | Kameda et al. |
| 2014/0018479 A1 | 1/2014 | Okada et al. |
| 2014/0121316 A1 | 5/2014 | Monsallier et al. |

FOREIGN PATENT DOCUMENTS

| | | | |
|---|---|---|---|
| JP | 2002-080682 A | 3/2002 | |
| JP | 2002080682 A * | 3/2002 | ............... C08L 47/00 |
| JP | 2011093989 * | 5/2011 | ............... C08L 23/28 |
| WO | 2008076409 A1 | 6/2008 | |

OTHER PUBLICATIONS

Machine translation of JP 2011093989, 16 pages, translation generated Apr. 2018 (Year: 2018).*
Human English language translation of JP-2002080682, 41 pages, translation generated Apr. 2018 (Year: 2018).*
Human translation of JP-2002080682, translation generated Apr. 2018, 41 pages. (Year: 2018).*
Structure of poly(methysilsesquioxane) methoxy terminated, from https://www.gelest.com/product/polymethylsilsesquioxane-methoxy-terminated/ (last accessed Oct. 29, 2018).
SDS relating to Gelest poly(methylsilsesquioxane) methoxy terminated, issued date Nov. 17, 2015.
Extended European Search Report and Opinion from EP application 15876053.8 dated Jul. 3, 2018.
International Preliminary Report on Patentability with Written Opinion from PCT/US2015/067396 (8 pages), dated Jul. 9, 2017.
PCT Search Report from PCT/US2015/067396 (5 pages), dated Jul. 2015.
Quirk, Roderic P., et al., "Anionic Synthesis of Trialkoxysilyl-Functional Polymers," Rubber Chem. & Tech., Mar. 2008, vol. 81, No. 1, pp. 77-95.
Machine translation of JP2002-080682, as provided by European Patent Office.

* cited by examiner

*Primary Examiner* — Robert S Loewe
(74) *Attorney, Agent, or Firm* — Meredith E. Hooker; Jenny L. Sheaffer

(57) ABSTRACT

Disclosed herein are terminal-functionalized polymers functionalized with silicon-containing functionalizing agents, rubber compositions including the polymers, methods for improving the cold flow resistance of a polymer, methods for improving the filler dispersion of a silica-filled rubber composition, and processes for preparing the terminal-functionalized polymer.

18 Claims, No Drawings

TERMINAL-FUNCTIONALIZED POLYMER AND RELATED METHODS

FIELD

The present application is directed to a terminal-functionalized polymer which is functionalized with a silicon-containing functionalizing agent, rubber compositions including the polymers, and related methods.

BACKGROUND

The use of silica filler in rubber compositions provides advantages such as a decrease in rolling resistance when the rubber composition is incorporated into a tire tread. A decrease in rolling resistance is generally associated with an improvement in fuel economy. However, silica filler can be difficult to disperse in rubber compositions.

SUMMARY

Disclosed herein are a terminal-functionalized polymer which is functionalized with a silicon-containing functionalizing agent, rubber compositions including the polymers, methods for improving the cold flow resistance of a polymer, methods for improving the filler dispersion of a silica-filled rubber composition, and processes for preparing the terminal-functionalized polymer.

In a first embodiment, a terminal-functionalized polymer is disclosed. In a first embodiment, a terminal-functionalized polymer is disclosed. The polymer has a structure according to one of formulas (I), (II), or (III) as follows:

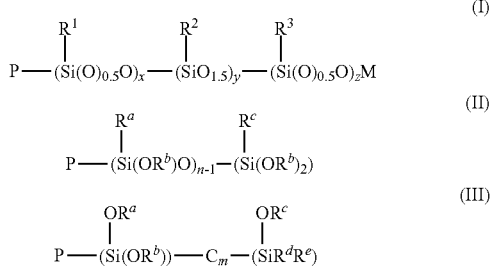

According to formulas (I), and (II), P is a polymer chain comprising at least one type of conjugated-diene monomer. According to formula (I), x, y and z are integers, where z does not equal 0, either x or y, but not both can be 0, and x+y+z≥8. Further according to formula (I), $R^1$, $R^2$ and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^6{}_2$, $OR^6$, $SCOR^6$, $CO_2R^6$, olefins, amino groups and vinyl-containing groups, wherein d=1 to 10, $R^5$ is selected from alkylene groups having 1 to 20 carbons, cycloalkylene groups having 3 to 20 carbons, $R^4$ and $R^6$ are selected from alkyl groups having 1 to 20 carbons, cycloalkyl groups having 3 to 20 carbons, and alkylaryl groups having 7 to 20 carbons, and M is selected from H or a metal. According to formula (II), $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing, $R^b$ is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20. According to formula (III), $R^a$, $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, $R^e$ is independently selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

In a second embodiment, a rubber composition is disclosed comprising 10-100 phr of the terminal-functionalized polymer according to the first embodiment, silica filler, and a cure package.

In a third embodiment, a method for improving the cold flow resistance of a polymer is disclosed. The method comprises terminating the live end of a polymer containing at least one type of conjugated diene-containing monomer with a Si-containing functionalizing agent to produce the terminal-functionalized polymer according to the first embodiment.

In a fourth embodiment, a method for improving the filler dispersion in a silica-filled rubber composition is disclosed. The method comprises utilizing 10-100 phr of the terminal-functionalized polymer of the first embodiment, 0-90 phr of at least one rubber, silica filler, and a cure package, to produce a silica-filled rubber composition.

In a fifth embodiment, a process for preparing a terminal-functionalized polymer according to the first embodiment is disclosed. The process comprises reacting the live end of a conjugated diene monomer-containing polymer chain with either (a) a polysilsesquioxane having at least 8 Si with each Si bonded to three O and each Si also bonded to one of $R^1$, $R^2$, $R^3$, where $R^1$, $R^2$, and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^6{}_2$, $OR^6$, $SCOR^6$, $CO_2R^6$, olefins, amino groups and vinyl-containing groups, wherein d=2 to 8, $R^5$ is selected from alkylene groups having 1 to 20 carbons, cycloalkylene groups having 3 to 20 carbons, and $R^4$ and $R^5$ are independently selected from alkyl groups having 1 to 20 carbons, cycloalkyl groups having 3 to 20 carbons, and alkylaryl groups having 7 to 20 carbons, or (b) a compound having formula (IV) or (V). Formulas (IV) and (V) are as follows:

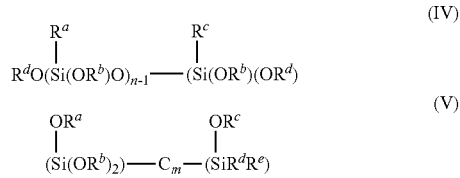

where for formula (IV) $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing; $R^b$ and $R^d$ are the same or different and each is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20 and for formula (V) $R^a$, each $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, and $R^e$ is selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

DETAILED DESCRIPTION

Disclosed herein are a terminal-functionalized polymer which is functionalized with a silicon-containing functionalizing agent, rubber compositions including the polymers, methods for improving the cold flow resistance of a polymer, methods for improving the filler dispersion of a silica-filled rubber composition, and processes for preparing the terminal-functionalized polymer.

In a first embodiment, a terminal-functionalized polymer is disclosed. In a first embodiment, a terminal-functionalized polymer is disclosed. The polymer has a structure according to one of formulas (I), (II), or (III) as follows:

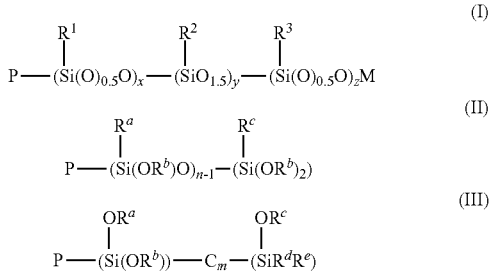

According to formulas (I), and (II), P is a polymer chain comprising at least one type of conjugated-diene monomer. According to formula (I), x, y and z are integers, where z does not equal 0, either x or y, but not both can be 0, and x+y+z≥8. Further according to formula (I), $R^1$, $R^2$ and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^6{}_2$, $OR^6$, $SCOR^6$, $CO_2R^6$, olefins, amino groups and vinyl-containing groups, wherein d=1 to 10, $R^5$ is selected from alkylene groups having 1 to 20 carbons, cycloalkylene groups having 3 to 20 carbons, $R^4$ and $R^6$ are selected from alkyl groups having 1 to 20 carbons, cycloalkyl groups having 3 to 20 carbons, and alkylaryl groups having 7 to 20 carbons, and M is selected from H or a metal. According to formula (II), $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing, $R^b$ is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20. According to formula (III), $R^a$, $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, $R^e$ is independently selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

In a second embodiment, a rubber composition is disclosed comprising 10-100 phr of the terminal-functionalized polymer according to the first embodiment, silica filler, and a cure package.

In a third embodiment, a method for improving the cold flow resistance of a polymer is disclosed. The method comprises terminating the live end of a polymer containing at least one type of conjugated diene-containing monomer with a Si-containing functionalizing agent to produce the terminal-functionalized polymer according to the first embodiment.

In a fourth embodiment, a method for improving the filler dispersion in a silica-filled rubber composition is disclosed. The method comprises utilizing 10-100 phr of the terminal-functionalized polymer of the first embodiment, 0-90 phr of at least one rubber, silica filler, and a cure package, to produce a silica-filled rubber composition.

In a fifth embodiment, a process for preparing a terminal-functionalized polymer according to the first embodiment is disclosed. The process comprises reacting the live end of a conjugated diene monomer-containing polymer chain with either (a) a polysilsesquioxane having at least 8 Si with each Si bonded to three O and each Si also bonded to one of $R^1$, $R^2$, $R^3$, where $R^1$, $R^2$, and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^6{}_2$, $OR^6$, $SCOR^6$, $CO_2R^6$, olefins, amino groups and vinyl-containing groups, wherein d=2 to 8, $R^5$ is selected from alkylene groups having 1 to 20 carbons, cycloalkylene groups having 3 to 20 carbons, and $R^4$ and $R^5$ are independently selected from alkyl groups having 1 to 20 carbons, cycloalkyl groups having 3 to 20 carbons, and alkylaryl groups having 7 to 20 carbons, or (b) a compound having formula (IV) or (V). Formulas (IV) and (V) are as follows:

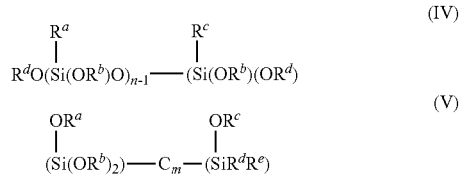

where for formula (IV) $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing; $R^b$ and $R^d$ are the same or different and each is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20 and for formula (V) $R^a$, each $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, and $R^e$ is selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

Definitions

The terminology as set forth herein is for description of the embodiments only and should not be construed as limiting the invention as a whole.

Unless otherwise indicated, the terms "alkyl" and "alkyl group" are used interchangeably herein to refer to a univalent group derived from an alkane by removal of a hydrogen atom from any carbon atom. Generally, the terms should be understood to include both branched and linear/unbranched structures.

Unless otherwise indicated, the term "alkidene" is used to refer to a bivalent group derived from an alkane by removal of two hydrogen atoms from separate carbon atoms. Generally, the term should be understood to include both branched and linear/unbranched structures.

Unless otherwise indicated herein, the abbreviation "mL" is used for millimeters.

Unless otherwise indicated herein, the abbreviation "M" when used in relationship to the concentration of a solution refers to molar concentration (i.e., moles per liter).

Unless otherwise indicated herein, the term "Mooney viscosity" refers to the compound Mooney viscosity, $ML_{1+4}$. As those of skill in the art will understand, a rubber composition's Mooney viscosity is measured prior to vulcanization or curing.

As used herein, the term "phr" means parts per one hundred parts rubber.

Polymer Chain Comprising at Least One Conjugated Diene Monomer

As discussed above, according to the first embodiment disclosed herein, the terminal functionalized polymer includes a polymer chain P comprising at least one conjugated diene monomer. As also discussed above, the second-fifth embodiments disclosed herein include the terminal functionalized polymer including a polymer chain P comprising at least one conjugated diene monomer or the reacting of a live end of a conjugated diene monomer-containing polymer chain. The below discussion relating to the polymer chain P comprising at least one conjugated diene monomer should be understood to apply equally to the first-fifth embodiments.

In various embodiments, the polymer chain P may comprises at least one type of conjugated diene monomer or at least one type of conjugated diene monomer in combination with at least one type of vinyl aromatic monomer. In other words, the polymer chain P may be or result in a polymer or copolymer. Unless indicated to the contrary, discussion of polymers herein should be understood to include copolymers.

Examples of suitable conjugated diene monomers for use in the polymer chain P include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diener may be utilized in certain embodiments. In certain embodiments, the polymer chain P further comprises at least one vinyl aromatic monomer. Examples of suitable vinyl aromatic monomers for use in the polymer chain P include, but are not limited to, styrene, α-methyl styrene, p-methylstyrene, o-methylstyrene, p-butylstyrene, vinylnaphthalene, p-tertbutylstyrene, vinyl catechol-based, and combinations thereof. In certain embodiments, the polymer chain P comprises a combination of 1,3-butadiene monomer and styrene monomer. Non-limiting examples of suitable combinations of monomers for use in the polymer chain P include, but are not limited to those which result in the following polymers and copolymers polybutadiene, styrene-butadiene rubber, styrene-isoprene rubber, styrene-butadiene-isoprene rubber, and polyisoprene.

In certain embodiments according to the first-fifth embodiments disclosed herein, the polymer chain P includes at least one functional group along the backbone of the polymer chain, at the head of the polymer chain (i.e., such as from a functionalized initiator), or both. In certain such embodiments the functional group along the backbone of the polymer chain, at the head of the polymer chain, or both comprises a silica-reactive functional group. Non-limiting examples of silica-reactive functional groups that are known to be utilized in functionalizing conjugated diene polymers or copolymers and are suitable for use in functionalizing the polymer chain P along its backbone include nitrogen-containing functional groups, silicon-containing functional groups, oxygen or sulfur-containing functional groups, and metal-containing functional group.

Non-limiting examples of nitrogen-containing functional groups include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-fifth embodiments disclosed herein, the polymer chain P is functionalized along its backbone, at its head, or both with at least one functional group selected from the foregoing list.

Non-limiting examples of silicon-containing functional groups include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments according to the first-fifth embodiments disclosed herein, the polymer chain P is functionalized along its backbone, at its head, or both with at least one functional group selected from the foregoing list.

Non-limiting examples of oxygen or sulfur-containing functional groups include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first-fifth embodiments disclosed herein, the polymer chain P is functionalized along its backbone, at its head, or both with at least one functional group selected from the foregoing list.

Structure of the Terminal-Functionalized Polymer & Functionalizing Agents

As discussed above, the terminal-functionalized polymer according to the first embodiment (or as used in the rubber compositions of the second embodiment, produced according to the method of the third embodiment, used in the silica-filled rubber composition of the fourth embodiment, or produced according to the process of the fifth embodiment), has a structure represented by one of formulas (I), (II), and (III). In other words, one of those formulas represents the structure of the polymer and the polymer can have a structure according to any one of those formulas. Formulas (I), (II), and (III) are as follows:

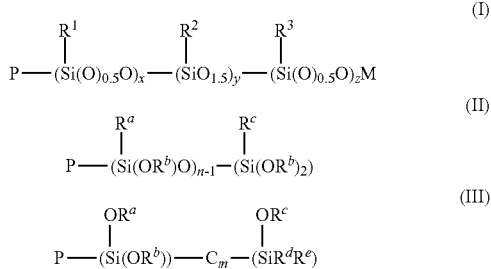

According to formulas (I), (II), and (III), P is a polymer chain comprising at least one type of conjugated-diene monomer. According to formula (I) x, y and z are integers, where z does not equal 0, either x or y, but not both can be 0, and x+y+z≥8. Further according to formula (I), $R^1$, $R^2$ and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^62$, $OR^6$, $SCOR^6$, $CO_2R^6$, olefins, amino groups and vinyl-containing groups, wherein d=1 to 10, $R^5$ is selected from alkylene groups having 1 to 20 carbons, cycloalkylene groups having 3 to 20 carbons, $R^4$ and $R^6$ are selected from alkyl groups having 1 to 20 carbons, cycloalkyl groups having 3 to 20 carbons, and alkylaryl groups having 7 to 20 carbons, and M is selected from H or a metal. According to formula (II), $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing, $R^b$ is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20. According to formula (III), $R^a$, $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, $R^e$ is independently selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

In certain embodiments, M comprises H or a metal selected from Li, Na, K, or Mg. Generally, any metal that is present for M will have been contributed by the initiator (e.g., an alkyl lithium or a sodium-containing initiator), by a modifier (e.g., potassium t-amalyte, sodium t-amalyte), or by another metal containing compound added during polymerization (e.g., dibutyl magnesium). After the reaction adding the terminating agent is complete, in certain embodiments, the terminal-functionalized polymer mixture is quenched in order to deactive any live alkali metal end groups (e.g., lithium end groups) which may remain. Quenching services to prevent the polymer from reacting with any carbon dioxide or oxygen which may be present. Quenching can be conducted in any known manner such as by adding water or alcohol (e.g., isopropanol) to the polymer mixture. After quenching, M comprises H or Li, with H being predominant.

According to each of formulas (I), (II) and (III), the polymer chain P is bonded directly to a Si. That Si is bonded also bonded to two oxygens and one carbon atom.

Terminal-functionalized polymers having a structure according to formula (I) or (II), may be produced by terminating the live end of a polymer chain P with a functional agent comprising a polysilsesquioxane having at least 8 Si with each Si bonded to three O and each Si also bonded to one of $R^1$, $R^2$, $R^3$, where $R^1$, $R^2$, and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^62$, $OR^6$, $SCOR^E$, $CO_2R^6$, olefins, amino groups and vinyl-containing groups, wherein d=2 to 8, $R^5$ is selected from alkylene groups having 1 to 20 carbons, cycloalkylene groups having 3 to 20 carbons, and $R^4$ and $R^5$ are independently selected from alkyl groups having 1 to 20 carbons, cycloalkyl groups having 3 to 20 carbons, and alkylaryl groups having 7 to 20 carbons. One or more than one polysilsesquioxane may be utilized. Various suitable polysilsesquioxanes having a structure according to formula (I) or (II) are commercially available from companies such as Gelest, Inc. (Morrisville, Pa.) and Sigma-Aldrich LLC (St. Louis, Mo.). Non-limiting examples of suitable polysilsesquioxanes suitable for use in preparing the terminal-functionalized polymers having a structure according to formula (I) or (II) as suitable functionalizing agents (a), include: poly(methylsilsesquioxane), poly(methylsilsesquioxane) methoxy terminated, poly(propyl)silsesquioxane) ethoxy terminated, poly(octylsilsesquioxane) ethoxy terminated, poly (methyl-hydridosilsesquioxane), poly(phenyl-vinylsilsesquioxane), and poly (methacryloxypropylsilsesquioxane). In certain embodiments of the first-fifth embodiments disclosed herein, the polysilsesquioxane used to functionalize the polymer (e.g., having a structure according to formula (I) or (II)) has at least 8 up to about 150 Si (e.g., 8, 10, 12, 15, 20, 25, 50, 75, 100, 110, 120, 130, 140 or 150) Si, including at least 8 up to 150, at least 8 up to about 100, at least 8 up to 100, at least 8 up to about 50, at least 8 up to 50, at least 8 up to about 20, at least 8 to 20, at least 8 to about 12, or 8-12

Si. In certain embodiments of the fifth embodiment, the functionalizing agent comprises a polysilsesquioxane (as described above) having at least 8 up to about 150 Si (e.g., 8, 10, 12, 15, 20, 25, 50, 75, 100, 110, 120, 130, 140 or 150) Si, including at least 8 up to 150, at least 8 up to about 100, at least 8 up to 100, at least 8 up to about 50, at least 8 up to 50, at least 8 up to about 20, or at least 8 to 20 Si. In certain embodiments of the fifth embodiment, the functionalizing agent comprises a polysilsesquioxane (as described above) having 8-12 Si. In certain embodiments of the first-fifth embodiments, the terminal-functionalized polymer has a polysilsesquioxane portion having a molecular weight of at least about 500 grams/mole; in certain such embodiments, the molecular weight of the polysilsesquioxane portion of the polymer is about 500 to about 10,000 grams/mole, including 500-10,000 grams/mole (e.g., 500, 1000, 1500, 2000, 2500, 3000, 4000, 5000, 6000, 7000, 8000, 9000, 10000 grams/mole).

Terminal-functionalized polymers having a structure according to formula (II), may be produced using a functionalizing agent having a structure according to formula (IV). Formula (IV) is as follows:

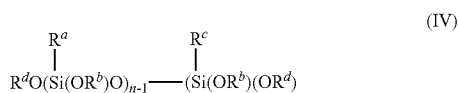

where for formula (IV) $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing; $R^b$ and $R^d$ are the same or different and each is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20. Various suitable materials having a structure according to formula (IV) are commercially available from companies such as Gelest, Inc. (Morrisville, Pa.). Non-limiting examples of materials having a structure according to formula (IV) or suitable for use in preparing the terminal-functionalized polymers having a structure according to formula (II) include: vinyltriethoxysilane oligomeric hydrolysate, vinyltriethoxysilane-propyltriethoxysilane oligomeric co-hydrolysate, vinyltrimethoxysilane oligomeric hydrolysate.

Terminal-functionalized polymers having a structure according to formula (III), may be produced using a functionalizing agent having a structure according to formula (V). Formula (V) is as follows:

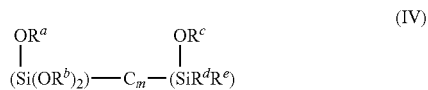

and within formula (IV), $R^a$, each $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons; $R^e$ is selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20. One or more than one functionalizing agent may be utilized. Various suitable materials having a structure according to formula (V) are commercially available from companies such as Gelest, Inc. (Morrisville, Pa.). In certain embodiments, the material having a structure according to formula (V) can be described as a bi-functionalized alkidene containing at least two Si, with one Si bonded to three alkoxy (or cycloalkoxy or alkaryloxy) groups and the other Si bonded to two alkoxy (or cycloalkoxy or alkaryloxy) groups and one alkyl, cycloalkyl or alkaryl group. Non-limiting examples of materials having a structure according to formula (V) or suitable for use in preparing the terminal-functionalized polymers having a structure according to formula (III): 1-(dimethoxymethylsilyl)-1-(trimethoxysilyl)methane, 1-(diethoxymethylsilyl)-1-(triethoxysilyl)methane, 1-(di-n-propoxymethylsilyl)-1-(tri-n-propoxysilyl)methane, 1-(diisopropoxymethylsilyl)-1-(triisopropoxysilyl)methane, 1-(di-n-butoxymethylsilyl)-1-(tri-n-butoxysilyl)methane, 1-(di-sec-butoxymethylsilyl)-1-(tri-sec-butoxysilyl)methane, 1-(di-t-butoxymethylsilyl)-1-(tri-t-butoxysilyl)methane, 1-(dimethoxymethylsilyl)-2-(trimethoxysilyl)ethane, 1-(diethoxymethylsilyl)-2-(triethoxysilyl)ethane, 1-(di-n-propoxymethylsilyl)-2-(tri-n-propoxysilyl)ethane, 1-(diisopropoxymethylsilyl)-2-(triisopropoxysilyl)ethane, 1-(di-n-butoxymethylsilyl)-2-(tri-n-butoxysilyl)ethane, 1-(di-sec-butoxymethylsilyl)-2-(tri-sec-butoxysilyl)ethane, 1-(di-t-butoxymethylsilyl)-2-(tri-t-butoxysilyl) ethane.

At Least One Rubber

In certain embodiments of the second and fourth embodiments disclosed herein, the rubber composition comprises at least one rubber in addition to the terminal-functionalized polymer; in certain such embodiments the total amount of the at least one rubber in addition to the terminal-functional polymer is 10-90 phr. Similarly, in certain embodiments, the terminal-functionalized polymer of the first embodiment or the terminal-functionalized polymer produced by the processes of the fifth embodiment is utilized in a rubber composition that comprises at least one rubber in addition to the terminal-functionalized polymer. Such rubber compositions can be understood as comprising in total 100 parts of rubber which will include the terminal-functionalized polymer as well as any additional rubbers. In certain embodiments of the first, second, fourth and fifth embodiments disclosed herein, the at least one rubber is selected from natural rubbers, synthetic rubbers, or combinations thereof. Suitable rubbers for use in certain embodiments of the first, second, fourth and fifth embodiments disclosed herein are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. Examples of fluorinated rubber include perfluoroelastomer rubber, fluoroelastomer, fluorosilicone, tetrafluoroethylene-propylene rubber, and combinations thereof. In certain embodiments of the first, second, fourth and fifth embodiments disclosed herein, the terminal functionalized polymer comprises 10-100 phr and the at least one rubber comprises (is present in an amount of) 0-90 phr; in certain such embodiments, the terminal functionalized polymer comprises 10-90 phr, including 10-80 phr, 10-70 phr, 10-60 phr, and 10-50 phr and the at least one rubber comprises (is present in an amount of) 90-10 phr, including 90-20 phr, 90-30 phr, 90-40 phr, and 90-50 phr. In certain embodiments of the first, second, fourth and fifth embodiments disclosed herein, the at least one rubber comprises (is present in an amount of) 10-90 phr, including 10-80 phr, 10-70 phr, 10-60 phr, and 10-50 phr and the terminal-functionalized polymer comprises (is present in an amount of) 90-10 phr, including 90-20 phr, 90-30 phr, 90-40 phr, and 90-50 phr.

Silica Filler

As discussed above, according to the second and fourth embodiments and in certain embodiments of the third embodiment, a silica filler is utilized. Generally, the silica filler will be a reinforcing filler. In certain such embodiments, about 5 to about 200 phr of silica filler is utilized, and one or more than one silica filler may be utilized. In certain embodiments of the second, third, and fourth embodiments disclosed herein, the total amount of the silica filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one filler. In certain embodiments, the useful upper range for the amount of silica filler can be considered to be somewhat limited by the high viscosity imparted by fillers of this type.

The term "reinforcing filler" is used herein to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments, the term "reinforcing filler" is used to refer to a particulate material that has a particle size of about 10 nm up to about 1000 nm, including 10 nm up to 1000 nm, about 10 nm up to about 50 nm, and 10 nm up to 50 nm.

Suitable silica fillers for use in the rubber composition disclosed herein are well known. Non-limiting examples of silica fillers suitable for use in certain embodiments of the second, third and fourth embodiments disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the second, third, and fourth embodiments disclosed herein, the rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the second, third, and fourth embodiments disclosed herein, the rubber composition comprises silica filler having a pH of about 5.5 to about 7 or slightly over 7, preferably about 5.5 to about 6.8. Some of the commercially available silica fillers which can be used in the rubber compositions of certain embodiments of the first-third embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165MP), and J. M. Huber Corporation.

In certain embodiments of the second, third, and fourth embodiments disclosed herein, as discussed in more detail below, the silica filler comprises a silica that has been pre-reacted with a silica coupling agent; preferably the pre-treated silica comprises a silica that has been pre-treacted with a silane-containing silica coupling agent.

Silica Coupling Agents

In certain embodiments of the second, third, and fourth embodiments disclosed herein, one or more silica coupling agents is utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the second, third, and fourth embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula HS—$R^3$—Si($R^4$)

($R^5$)$_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula B—S—$R^6$—Si—$X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the second, third, and fourth embodiments disclosed herein include, but are not limited to, octyltriethoxysilane, octyltrimethoxysilane, trimethylethoxysilane, cyclohexyltriethoxysilane, isobutyltriethoxysilane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the second, third and fourth embodiments disclosed herein include bis(trialkoxysilylorgano) disulfides and bis(trialkoxysilylorgano)tetrasulfides. Specific non-limiting examples of bis(trialkoxysilylorgano)disulfides suitable for use in certain exemplary embodiments of the second, third, and fourth embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in certain embodiments of the second, third, and fourth embodiments disclosed herein include, but are not limited to, bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the second, third and fourth embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the second, third and fourth embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethylthioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3- methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the second, third and fourth embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr about 5 to about 200 phr, including about 25 to about 150 phr, about 35 to about 150 phr, about 25 to about 125 phr, about 25 to about 100 phr, about 25 to about 80 phr, about 35 to about 125 phr, about 35 to about 100 phr, and about 35 to about 80 phr).

When a silica coupling agent is utilized in an embodiment of the second, third, and fourth embodiments disclosed herein, the amount used may vary. In certain embodiments of the second, third, and fourth embodiments disclosed herein, the rubber compositions do not contain any silica coupling agent. In other embodiments of the second, third, and fourth embodiments disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Other Fillers

In certain embodiments of the second, third, and fourth embodiments disclosed herein, a carbon black filler is utilized. In other words, carbon black is not considered to be an essential component of the second, third or fourth embodiments disclosed herein. Carbon black is generally a reinforcing filler. In those embodiments of the second, third, and fourth embodiments that include one or more carbon blacks, the total amount of carbon black and any other reinforcing filler (e.g., silica filler) is about 10 to about 200 phr (including 10 to 200 phr). In certain embodiments of the second, third, and fourth embodiments disclosed herein, carbon black is included in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the second, third, and fourth embodiments disclosed herein, the carbon black comprises no more than about 30% by weight (including no more than 30% by weight) of the total reinforcing filler in the rubber composition. In certain embodiments of the first-third embodiments disclosed herein, the rubber composition comprises about 5 to about 100 phr (including 5 to 100 phr) of one or more carbon blacks. Generally, suitable carbon black for use in certain embodiments of the second, third, and fourth embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the rubber composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

In certain embodiments of the second, third, and fourth embodiments, at least one additional reinforcing filler in addition to the silica filler and the optional carbon black is utilized. Non-limiting examples of suitable additional reinforcing fillers for use in certain embodiments of the second, third, and fourth embodiments disclosed herein include, but are not limited to, alumina, aluminum hydroxide, clay, magnesium hydroxide, boron nitride, aluminum nitride, titanium dioxide, reinforcing zinc oxide, and combinations thereof. In certain embodiments of the second, third, and fourth embodiments, at least one inorganic filler in addition to the silica filler and the optional carbon black is utilized. Suitable inorganic fillers for use in certain embodiments of the second, third, and fourth embodiments disclosed herein are not particularly limited and non-limiting examples include: aluminum hydroxide, talc, clay, alumina ($Al_2O_3$), aluminum hydrate ($Al_2O_3H_2O$), aluminum hydroxide (Al$(OH)_3$), aluminum carbonate ($Al_2(CO_3)_2$), aluminum nitride, aluminum magnesium oxide ($MgOAl_2O_3$), pyrofilite ($Al_2O_3 4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

Cure Package

As discussed above, according to the second and fourth embodiments and in certain embodiments of the third embodiment, a cure package is utilized. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the second, third, and fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the second, third, and fourth embodiments disclosed herein include, but are not limited to, thiazole vulcanization accelerators, such as 2-mercaptobenzothiazole, 2,2'-dithiobis (benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients for Rubber Compositions

Various other ingredients that may be employed in certain embodiments of the second, third, and fourth embodiments disclosed herein are well known to those of skill in the art and include oils (processing and extender), waxes, processing aids, tackifying resins, reinforcing resins, peptizers, and one or more additional rubbers.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXON MOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, for most applications the total amount of oil used (processing oil and extender oil) in the rubber compositions and methods disclosed herein ranges from about 1 to about 70 phr, including 1 to 70 phr, about 2 to about 60 phr, 2 to 60 phr, about 3 to about 50 phr, and 3 to 50 phr. However, in certain applications, the total amount of oil used (processing oil and extender oil) in the rubber compositions and methods disclosed herein is much higher and ranges up to about 175 phr, including up to 175 phr, up to about 150 phr, up to 150 phr, up to about 100 phr, and up to 100 phr.

Methods for Preparing Rubber Compositions

Rubber compositions according to the second and fourth embodiments disclosed herein as well as rubber compositions incorporating the terminal-functionalized polymer of the first or third embodiments or the terminal-functionalized polymer resulting from the process of the fifth embodiment, may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the compositions and methods disclosed herein, more than one non-productive master-batch mixing stage may be used. In certain embodiments of the compositions and methods disclosed herein, more than one non-productive master-batch mixing stage is used and the hemp oil is added in the first (initial) master-batch stage. In other embodiments of the compositions and methods disclosed herein, at least two non-productive master-batch mixing stages are used and the hemp oil is added in the second master-batch stage. In other embodiments of the compositions and methods disclosed herein, at least two non-productive master-batch mixing stages are used and the hemp oil is added in more than one master-batch stage. In yet other embodiments of the compositions and methods disclosed herein, more than one non-productive master-batch mixing stage is used and the hemp oil is added in the last non-productive master-batch mixing stage.

In certain embodiments of the methods for preparing rubber compositions according to the first-third embodiments disclosed herein, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

Methods for Improving the Cold Flow Resistance of a Polymer

As discussed above, according to the third embodiment, a method for improving the cold flow resistance of a polymer (or a rubber composition comprising the polymer) is disclosed. The method comprises terminating the live end of a polymer containing at least one type of conjugated diene-containing monomer with a Si-containing compound to produce the terminal-functionalized polymer according to the first embodiment. In certain embodiments of the third embodiment, the improvement in cold flow resistance is measured by an increase in residual sample gauge (i.e., sample thickness) as measured by plasticity testing (e.g., using a Scott plasticity tester as described below). The improvement in cold flow resistance is as compared to a polymer having the same monomers, but lacking the terminal functionalization (or a composition having the same ingredients other than the terminal functionalized polymer). In certain embodiments, the residual sample gauge increases by at least about 5%, including at least 5%, at least about 10%, at least 10%, at least about 15%, at least 15%, at least about 20%, at least 20%, at least about 25%, at least 25%, at least about 30%, at least 30%, at least about 35%, at least 35%, at least about 40%, and at least 40%. In certain embodiments, the cold flow resistance increases by at least about 5% to about 40%, including 5% to 40%, about 5% to about 30%, 5% to 30%, about 5% to about 25%, 5% to 25%, about 5% to about 20%, 5% to 20%, about 10% to about 40%, and 10% to 40%.

In certain embodiments, the improvement in cold flow resistance of the polymer can be measured using a Scott tester according to the following procedure. A polymer sample (15.5 grams) is melt pressed in an Instron compression mold using a Carver Press at 100° C. for 20 minutes. After cooling, samples are removed from the press as cylinder shapes with a diameter and height of uniform thickness of 40.0 mm×13.0 mm, respectively. The Scott tester then uses a weight (5000 grams) placed on top of the cylinder to press the cylinder-shaped samples for 30 minutes (at approximately 25° C.) at which time the polymer sample thickness is measured. A relatively thicker thickness is indicative of increased cold flow resistance (i.e., an improvement in cold flow resistance) of the polymer.

Methods for Improving the Filler Dispersion of a Silica-Filled Rubber Composition As discussed above, according to the fourth embodiment disclosed herein, a method for improving the filler dispersion in a silica-filled rubber composition is disclosed. The method comprises utilizing 10-100 phr of the terminal-functionalized polymer of the first embodiment, 0-90 phr of at least one rubber, silica filler, and a cure package, to produce a silica-filled rubber composition. In certain embodiments of the fourth embodiment, the improvement in filler dispersion is measured by an increase in the percentage of bound rubber (according to the bound rubber test described below). In certain embodiments of the fourth embodiment, the improvement in filler dispersion is measured using microscopy data. The improvement in filler dispersion is as compared to a rubber composition comprising the same ingredients except for replacing the terminal-functionalized polymer with an equivalent amount of non-terminal functionalized polymer. In certain embodiments, the percentage of bound rubber increases by at least about 50%, including at least 50%, at least about 100% (i.e., at least a doubling), at least 100% (i.e., at least a doubling), at least about 150%, and at least 150%. In certain embodiments, the percentage of bound rubber increases by at least about 50% to about 200%, including 50% to 200%, about 50% to about 150%, and 50% to 150%.

Details concerning the silica filler and the cure package, as well as other optional components of the rubber composition according to the fourth embodiment disclosed herein are discussed above and should be considered to apply to the fourth embodiment as if fully set forth within this section.

Processes for Preparing a Terminal Functionalized Polymer

As discussed above, the fifth embodiment disclosed herein is directed to a process for preparing a terminal-functionalized polymer (having the structure (I), (II), or (III)), the process comprising reacting the live end of a conjugated diene monomer-containing polymer chain with either (a) a polysilsesquioxane having at least 8 Si with each Si bonded to three O and each Si also bonded to one of $R^1$, $R^2$, $R^3$, where $R^1$, $R^2$, and $R^3$ are the same or different and are selected from the group consisting of: (i) H, an alkyl group having 1 to 20 carbons, or an alkoxy group having 1 to 20 carbons, (ii) cycloalkyl group or cycloalkoxy groups having 3 to 20 carbons, (iii) alkylaryl or alkaryloxy groups having 7 to 20 carbons, and (iv) $R^5X$, where X is selected from Cl, Br, $S_dR^6$, $NR^6{}_2$, $OR^6$, $SCOR^6$, $CO_2R^6$, olefins, amino groups and vinyl-containing groups, wherein d=2 to 8, $R^5$ is selected from alkylene groups having 1 to 20 carbons, cycloalkylene groups having 3 to 20 carbons, and $R^4$ and $R^5$ are independently selected from alkyl groups having 1 to 20 carbons, cycloalkyl groups having 3 to 20 carbons, and alkylaryl groups having 7 to 20 carbons, or (b) a compound having structure (IV) or (V). Structures (IV) and (V) are as follows:

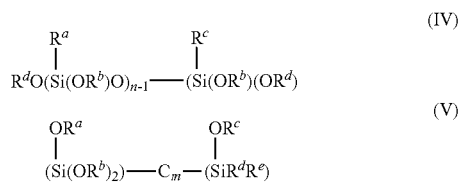

where for formula (IV) $R^a$ and $R^c$ are the same or different and each is independently selected from H, alkyl groups having 1 to 20 carbons, cycloalkyl groups having 3 to 20 carbons, alkylaryl groups having 7 to 20 carbons, and vinyl-containing groups of the foregoing; $R^b$ and $R^d$ are the same or different and each is selected from: (i) an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and n is 2 to 20; and where for formula (V) $R^a$, each $R^b$, $R^c$ and $R^d$ are the same or different and each is independently selected from H, alkyl groups having 1 to 20 carbons, cycloalkyl groups having 3 to 20 carbons, alkylaryl groups having 7 to 20 carbons, and $R^e$ is selected from: (i) H, an alkyl group having 1 to 20 carbons, or an alkoxy group having 1 to 20 carbons, (ii) cycloalkyl group or cycloalkoxy groups having 3 to 20 carbons, and (iii) alkylaryl or alkaryloxy groups having 7 to 20 carbons; and m is 1 to 20.

The terminal-functionalized polymer produced according to the process of the fifth embodiment disclosed herein, may be utilized in the rubber compositions according to the second and fourth embodiments disclosed herein, or in other rubber compositions.

Generally, the processes according to the fifth embodiment disclosed herein comprise anionic polymerizations, the general details (i.e., other than the use of terminating agents according to (a) or (b)) are well known to those having skill in the art. Generally, conjugated diene monomer-containing polymers or copolymers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. According to certain embodiments of the fifth embodiment, an anionic polymerization is conducted wherein an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. Generally, the polymerization is conducted using a conjugated diene monomer alone or a mixture of a conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

In certain embodiments, the anionic polymerization process is carried out in the presence of a randomizer. The randomizer can control the microstructure of the conjugated diene compound, and has an action that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments.

Example 1: Synthesis of SBRs with 20% Styrene and 55% Vinyl Bond Microstructure

In Examples 1(a)-1(e), styrene-butadiene polymer having 20% styrene and 55% vinyl bond microstructure (in the butadiene portion of the polymer) was prepared. Each of the four polymers was terminated using a different compound. The polymer of Example 1(a) was terminated using isopropanol, and can be considered a control. The polymers of Examples 1(b)-1(e) were terminated using poly(methylsilsesquioxane) methoxy terminated, poly(propylsilsesquioxane) methoxy terminated, vinyltrimethoxysilane oligomeric hydrolysates, and 1-(triethoxy-silyl)-2-(diethoxymethylsilyl)ethane, respectively. Properties of the resulting polymers are provided below in Table 1.

The following procedure was used to prepare the polymers of Examples 1(a)-(d). To a jacketed two gallon $N_2$ purged reactor equipped with a stirrer was added 1.341 kg of hexane, 0.446 kg of 33.5 wt % styrene in hexane, and 3.151 kg of 19.0 wt % 1,3-butadiene in hexane. The reactor was charged with 3.9 mL of n-butyl lithium (BuLi) (1.6 M) in hexane, followed by 1.20 mL of 2,2-bis(2'-tetrahydrofuryl) propane (1.6 M in hexane), and the reactor jacket was heated to 50° C. After 36 minutes, the batch temperature peaked at 63.5° C. After an additional 30 minutes, the polymer cement was dropped into dried 28-oz glass bottles and reacted (terminated) with: isopropyl alcohol for Example 1(a), poly (methylsilsesquioxane) methoxy terminated (1.3 M) for Example 1(b), poly(propylsilsesquioxane) methoxy terminated (0.9 M) for Example 1(c); vinyltrimethoxysilane oligomeric hydrolysates (1.6 M) for Example 1(d), or 1-(triethoxy-silyl)-2-(diethoxymethylsilyl)ethane (2.9 M) for Example 1(e). Each bottle was placed in a 50° C. water bath for 30 minutes. The resulting polymer cements were each dropped into isopropyl alcohol containing butylated hydroxytoluene (BHT), and then drum dried. The resulting polymers had the following properties (Table 1), with Mn indicating the number average molecular weight in grams/mole (by GPC), Mw indicating the weight average molecular weight in grams/mole (by GPC), Mp indicating the peak molecular weight in grams/mole (by GPC), MWD indicating the molecular weight dispersion or polydispersity (calculated by dividing Mw/Mn), and Tg indicating the glass transition temperature. Generally, a number average molecular weight (Mn) of these polymers may be determined by using gel permeation chromatography (GPC) calibrated with polystyrene standards and Mark-Houwink constants for the polymer in question.

TABLE 1

| Polymer | $M_n$ (g/mole) | $M_w$ (g/mole) | $M_p$ (g/mole) | MWD | % coupling | Tg (° C.) |
|---|---|---|---|---|---|---|
| Example 1(a) | 112734 | 117635 | 115556 | 1..04 | 0.0 | −40.14 |
| Example 1(b) | 175599 | 235457 | 117350 | 1.34 | 58.83 | −39.63 |
| Example 1(c) | 150610 | 187370 | 118506 | 1.24 | 42.89 | −41.88 |
| Example 1(d) | 195829 | 243303 | 227895 | 1.24 | 74.87 | −40.51 |
| Example 1(e) | 137103 | 174096 | 118340 | 1.27 | 27.94 | −41.70 |

Example 2: Synthesis of SBRs with 36% Styrene and 28% Vinyl Bond Microstructure

In Examples 2(a)-2(e), styrene-butadiene polymer having 36% styrene and 28% vinyl bond microstructure (in the butadiene portion of the polymer) was prepared. Each of the four polymers was terminated using a different compound. The polymer of Example 2(a) was terminated using isopropanol, and can be considered a control. The polymers of Examples 2(b)-2(e) were terminated using poly(methylsilsesquioxane)-methoxy terminated, poly(propylsilsesquioxane)-methoxy terminated, vinyltrimethoxysilane oligomeric hydrolysates, and 1-(triethoxy-silyl)-2-(diethoxymethylsilyl)ethane respectively. Properties of the resulting polymers are provided below in Table 2.

The following procedure was used to prepare the polymers of Examples 2(a)-2(d). To a jacketed two gallon $N_2$ purged reactor equipped with a stirrer was added 1.557 kg of hexane, 0.834 kg of 32.3 wt % styrene in hexane, and 2.548 kg of 18.8 wt % 1,3-butadiene in hexane. The reactor was charged with 3.9 mL of n-butyl lithium (BuLi) (1.6 M) in hexane, followed by 0.5 mL of potassium t-amylate (KTA) (1.0 M) and 0.3 mL of 2,2-bis(2'-tetrahydrofuryl)propane (1.6 M in hexane), and the reactor jacket was heated to 65° C. After 29 minutes, the batch temperature peaked at 75.3° C. After an additional 30 minutes, the polymer cement was dropped into four dried 28-oz glass bottles and reacted (terminated) with: isopropyl alcohol for Example 2(a), poly (methylsilsesquioxane)-methoxy terminated (1.3 M) for Example 2(b), poly(propylsilsesquioxane)methoxy terminated (0.9 Molar) for Example 2(c), vinyltrimethoxysilane oligomeric hydrolysates (1.6 Molar) for Example 2(d), 1-(triethoxy-silyl)-2-(diethoxymethylsilyl)ethane (2.9 M) for Example 2(e). Each bottle was placed in a 50° C. water bath for 30 minutes. The resulting polymer cements were each dropped into isopropyl alcohol containing butylated hydroxytoluene (BHT), and then drum dried. The resulting polymers had the following properties (Table 2)

TABLE 2

| Polymer | $M_n$ (g/mole) | $M_w$ (g/mole) | $M_p$ (g/mole) | MWD | % coupling | Tg (° C.) |
|---|---|---|---|---|---|---|
| Example 2(a) | 102395 | 107932 | 105793 | 1.05 | 0 | −41.52 |
| Example 2(b) | 162144 | 275662 | 105645 | 1.70 | 56.14 | −43.17 |
| Example 2(c) | 142805 | 191563 | 106239 | 1.34 | 49.84 | −42.41 |
| Example 2(d) | 166834 | 234306 | 208905 | 1.40 | 66.30 | −41.46 |
| Example 2(e) | 117485 | 163657 | 101253 | 1.39 | 29.23 | −39.27 |

Example 3—Preparation of Rubber Compositions Containing the SBRs of Examples 1 and 2

The SBRs prepared in Examples 1 and 2 were utilized to prepare vulcanizable rubber compositions with silica filler. Complete formulations for the rubber compositions are shown in Table 3. The mixing procedure used to prepare the rubber compositions is shown in Table 4.

TABLE 3

| Example # | Amount (phr) |
|---|---|
| Master-Batch | |
| SBR polymer | 80 |
| Natural rubber | 20 |
| Silica filler | 52.5 |
| Wax | 2 |
| Processing oil | 10 |
| Stearic acid | 2 |
| 6PPD | 0.95 |
| Re-Mill | |
| Silica filler | 2.5 |
| Silane (bis(3-triethoxysilyl)propyltetrasulfide) | 5 |
| Final | |
| Sulfur | 1.5 |
| N-t-butylbenzothiazole-2-sulfenamide (TBBS) | 0.7 |
| 2,2'-dithiobisbenzothiazole (MBTS) | 2 |
| N,N'-diphenylguanidine (DPG) | 1.4 |
| Zinc Oxide | 2.5 |
| Total phr | 183.05 |

TABLE 4

| Mixing Parameters | | |
|---|---|---|
| Stage | Time | Condition |
| Master-Batch | 0 seconds | Charge polymers |
| Stage 1 (initial temp: 120-125° C., rotor rpm started at 50) | 30 seconds | Charge any oil, silica filler and other master-batch ingredients, increase rotor speed to 90 rpm<br>Drop based on max temperature of 165° C. or 5.5 minutes mixing (whichever comes first) |
| Remill Stage (initial temp: 130-135° C., rotor rpm at 50) | 0 seconds | Charge Master Batch<br>Drop based on max temperature of 150° C. or 3.5 minutes mixing (whichever comes first) |
| Final Batch Stage (initial temp: 65-70° C., rotor rpm at 45) | 0 seconds<br>0 seconds | Charge Remill<br>Charge curatives<br>Drop based on max temperature of 100° C. or 2.5 minutes mixing (whichever comes first) |

Ten rubber compositions were prepared, each using one of the rubbers of Examples 1(a)-1(e) or Examples 2(a)-2(e) for the SBR. The rubber compositions were numbered as Samples 9-18. Samples 9 and 14 (containing non-functionalized SBR) can be considered controls. Certain properties of the rubber compositions were measured and reported below in Table 5. Indexed values were calculated by dividing the value for a rubber composition according to the present disclosure (i.e., Samples 10-13 and 15-18) by its control (i.e., Samples 9 and 14, respectively).

Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 60° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. A rubber composition's tan δ at 60° C. is indicative of its rolling resistance when incorporated into a tire tread.

The Mooney viscosities disclosed herein were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor starts. The Mooney viscosity was recorded for each sample as the torque at four minutes after the rotor started. Generally, a lower Mooney viscosity is beneficial. Therefore a lower index value for Mooney viscosity can be considered advantageous.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

The cold-flow resistance of each polymer sample was measured by using a Scott plasticity tester. Approximately 2.5 g of the polymer was molded, at 100° C. for 20 minutes, into a cylindrical button with a diameter of 15 mm and a height of 12 mm. After cooling down to room temperature, the button was removed from the mold and placed in a Scott plasticity tester at room temperature. A 5-kg load was applied to the specimen. After 8 minutes, the residual sample gauge (i.e., sample thickness) was measured. Generally, the residual sample gauge can be taken as an indication of the cold-flow resistance of the polymer, with a higher residual sample gauge indicating better cold-flow resistance.

TABLE 5

| Property | 9 | 10 | 11 | 12 | 13 | 14 | 15 | 16 | 17 | 18 |
|---|---|---|---|---|---|---|---|---|---|---|
| Indexed $ML_{1+4}$ | 1.00 | 2.70 | 1.79 | 3.35 | 2.36 | 1.00 | 2.51 | 1.96 | 3.17 | 2.03 |
| Indexed tan δ (at 60° C.) | 1.00 | 0.54 | 0.65 | 0.54 | 0.54 | 1.00 | 0.59 | 0.74 | 0.61 | 0.66 |
| Indexed Bound rubber % | 1.00 | 2.90 | 2.17 | 2.93 | 3.47 | 1.00 | 3.33 | 2.36 | 3.54 | 3.28 |

As can be seen from the data in Table 5, the use of the silicone-containing functionalizing agents to end terminate the polymers (i.e., Samples 10-13 and 15-18) provided a marked improvement in the percentage of bound rubber and a beneficial decrease in tan δ. The data indicates an improvement in the dispersion of the silica filler in those rubber compositions containing a polymer terminated with one of the silicon-containing terminators. Additionally, the rubber compositions containing a polymer terminated with one of the silicon-containing terminators exhibited improved cold flow resistance.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:
1. A rubber composition comprising
  (a) 10-100 phr of a terminal-functionalized polymer having a vinyl bond content of at least about 20% and the following structure

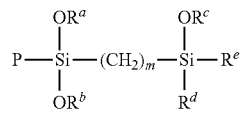

wherein P is a polymer chain comprising a randomized configuration of at least one type of conjugated-diene monomer and at least one type of vinyl aromatic monomer;
  $R^a$, $R^b$, $R^c$ and $R^d$ are the same or different and each is independently selected from H, alkyl groups having 1 to 20 carbon atoms, cycloalkyl groups having 3 to 20 carbon atoms, alkylaryl groups having 7 to 20 carbon atoms, $R^e$ is independently selected from:
- (i) H, an alkyl group having 1 to 20 carbon atoms, and an alkoxy group having 1 to 20 carbon atoms,
- (ii) cycloalkyl group or cycloalkoxy groups having 3 to 20 carbon atoms, and
- (iii) alkylaryl or alkaryloxy groups having 7 to 20 carbon atoms; and m is 1 to 20;

(b) 0-90 phr of at least one rubber; and (c) about 10 to about 150 phr of silica filler.

2. The rubber composition of claim 1, wherein the at least one conjugated-diene monomer is 1,3-butadiene and the at least one vinyl aromatic monomer is styrene.

3. The rubber composition of claim 2, wherein the silica filler is present in an amount of 35 to 150 phr.

4. The rubber composition of claim 2, wherein the total amount of reinforcing filler is about 10 to about 200 phr.

5. The rubber composition of claim 2, further comprising carbon black filler.

6. The rubber composition of claim 5, wherein the reinforcing filler includes carbon black in an amount of no more than 30% by weight based upon the total weight of the reinforcing filler.

7. The rubber composition of claim 1, wherein the silica filler is present in an amount of 35 to 150 phr.

8. The rubber composition of claim 1, wherein the total amount of reinforcing filler is about 10 to about 200 phr.

9. The rubber composition of claim 1, further comprising carbon black filler.

10. The rubber composition of claim 9, wherein the reinforcing filler includes carbon black in an amount of no more than 30% by weight based upon the total weight of the reinforcing filler.

11. The process of claim 10, wherein the at least one conjugated-diene monomer is 1,3-butadiene and the at least one vinyl aromatic monomer is styrene.

12. A method for improving the filler dispersion in a silica-filled rubber composition, the method comprising utilizing 10-100 phr of a terminal-functionalized polymer having a vinyl bond content of at least about 20% and the following structure

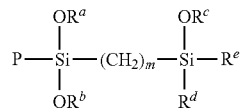

wherein, P is a polymer chain comprising a randomized configuration of at least one type of conjugated-diene monomer and at least one type of vinyl aromatic monomer, $R^a$, $R^b$, $R^c$ and $R^d$ are the same or different and each is independently selected from H, alkyl groups having 1 to 20 carbon atoms, cycloalkyl groups having 3 to 20 carbon atoms, alkylaryl groups having 7 to 20 carbon atoms, $R^e$ is independently selected from:
- (i) H, an alkyl group having 1 to 20 carbon atoms, and an alkoxy group having 1 to 20 carbon atoms,
- (ii) cycloalkyl group or cycloalkoxy groups having 3 to 20 carbon atoms, and
- (iii) alkylaryl or alkaryloxy groups having 7 to 20 carbon atoms; and m is 1 to 20;

0-90 phr of at least one rubber, 10-200 phr of silica filler, and a cure package to produce a silica-filled rubber composition.

13. The process of claim 12, wherein the conjugated diene monomer is 1,3-butadiene and the vinyl aromatic monomer is styrene.

14. The method of claim 12, wherein the terminal-functionalized polymer is styrene-butadiene and is present in an amount of 20 to 90 phr.

15. The method of claim 12, wherein the silica filler is present in an amount of 35 to 150 phr.

16. The process of claim 12, wherein the silica-filled rubber composition has a total amount of reinforcing filler of about 10 to about 200 phr.

17. The process of claim 16, wherein the reinforcing filler includes carbon black in an amount of no more than 30% by weight based upon the total weight of the reinforcing filler.

18. The process of claim 12, further comprising utilizing carbon black filler in the silica-filled rubber composition.

* * * * *